(12) United States Patent
Butler et al.

(10) Patent No.: US 11,396,160 B2
(45) Date of Patent: *Jul. 26, 2022

(54) LAMINATED GLASS COMPRISING INTERLAYER FILM LAYERS WITH A PIGMENTED FRAME

(71) Applicant: KURARAY EUROPE GMBH, Hattersheim (DE)

(72) Inventors: Charles Butler, Rochester, MI (US); Uwe Keller, Avon (FR); Niklas Steinbach, Hattersheim (DE); Robert Fuss, Hattersheim (DE)

(73) Assignee: KURARAY EUROPE GMBH, Hattersheim (DE)

( * ) Notice: Subject to any disclaimer, the term of this patent is extended or adjusted under 35 U.S.C. 154(b) by 1 day.

This patent is subject to a terminal disclaimer.

(21) Appl. No.: 16/641,838

(22) PCT Filed: Aug. 1, 2018

(86) PCT No.: PCT/EP2018/070896
§ 371 (c)(1),
(2) Date: Feb. 25, 2020

(87) PCT Pub. No.: WO2019/038043
PCT Pub. Date: Feb. 28, 2019

(65) Prior Publication Data
US 2020/0215796 A1 Jul. 9, 2020

Related U.S. Application Data

(60) Provisional application No. 62/550,015, filed on Aug. 25, 2017.

(51) Int. Cl.
*B32B 17/10* (2006.01)
*B32B 27/08* (2006.01)
(Continued)

(52) U.S. Cl.
CPC .... *B32B 17/10036* (2013.01); *B32B 17/1066* (2013.01); *B32B 17/10275* (2013.01);
(Continued)

(58) Field of Classification Search
None
See application file for complete search history.

(56) References Cited

U.S. PATENT DOCUMENTS 4,910,380 A * 3/1990 Reiss ................ B32B 17/10036
15/250.05
9,028,644 B2 5/2015 Keller
(Continued)

FOREIGN PATENT DOCUMENTS

| DE | 102005062272 B4 | 3/2016 |
| EP | 3095601 A1 | 11/2016 |
| WO | 2004011271 A1 | 2/2004 |

*Primary Examiner* — Ramsey Zacharia
(74) *Attorney, Agent, or Firm* — Brooks Kushman P.C.

(57) ABSTRACT

Laminated glass having an opaque frame area is obtained by laminating at least one film A containing polyvinyl acetal PA and optionally at least one plasticiser WA and at least one film B containing a polyvinyl acetal PB and at least one plasticiser WB between two glass sheets, wherein prior to lamination
the amount of plasticiser WA in film A is less than 22% by weight
the amount of plasticiser WB in film B is at least 22% by weight and
film A comprises at least on one surface a non-transparent region.

15 Claims, 1 Drawing Sheet

(51) Int. Cl.
    *B32B 27/22*    (2006.01)
    *B32B 27/30*    (2006.01)
(52) U.S. Cl.
    CPC ........ *B32B 17/10761* (2013.01); *B32B 27/08* (2013.01); *B32B 27/22* (2013.01); *B32B 27/306* (2013.01); *B32B 2250/04* (2013.01); *B32B 2311/30* (2013.01); *B32B 2313/04* (2013.01); *B32B 2331/04* (2013.01); *B32B 2605/08* (2013.01)

(56) References Cited

U.S. PATENT DOCUMENTS

| | | | |
|---|---|---|---|
| 2005/0234185 A1* | 10/2005 | Smith | B32B 17/10688 524/557 |
| 2013/0074910 A1* | 3/2013 | Isoue | B32B 17/10678 136/251 |
| 2014/0212639 A1 | 7/2014 | Wery et al. | |
| 2014/0224423 A1 | 8/2014 | Keller | |
| 2015/0217547 A1* | 8/2015 | Greb | B32B 17/10587 156/308.6 |
| 2016/0243796 A1 | 8/2016 | Mannheim Astete et al. | |
| 2017/0113520 A1* | 4/2017 | Sienerth | B32B 17/10137 |
| 2018/0037094 A1 | 2/2018 | Legrand | |

\* cited by examiner

LAMINATED GLASS COMPRISING INTERLAYER FILM LAYERS WITH A PIGMENTED FRAME

CROSS REFERENCE TO RELATED APPLICATIONS

This application is the U.S. National Phase of PCT Appln. No. PCT/EP2018/070896 filed Aug. 1, 2018, which claims priority to U.S. Appln. No. 62/550,015, filed Aug. 25, 2017, the disclosures of which are incorporated in their entirety by reference herein.

BACKGROUND OF THE INVENTION

1. Field of Invention

The present invention relates to laminated glass, especially windshields, comprising two glass sheets combined by an adhesive interlayer film which is provided at least on one edge region of the laminated glass with a pigmented band.

2. Description of the Related Art

In most windshields for cars, the inner glass sheet is provided with a non-transparent, mostly black, frame to protect the sealing or the adhesive which mechanically connects the windshield with the chassis from UV radiation. A common technique is to silk screen print low melting black glass frit on the glass surface and then sinter this frit at temperatures over 600° C. in order to solidify the printed-on mixture. Typically the sintering is achieved during the glass forming step (i.e. bending of the initially flat sheet glass at temperatures above 600° C.). Nowadays, there is a strong trend in the automotive industry of minimizing the weight of glazing part by using thinner glass sheets.

It has now been found that the above mentioned silk screen printing step can lead to increased breakage rates of thin glass sheets and also lead to blurring of the print due to vibration of very light weight glass sheet. Additional issues arise during the bending step since pigmented black regions have stronger heat absorption which will cause temperature inhomogeneity in the glass part thus complicating even bending.

It would thus be beneficial to provide a pigmented edge region to a windshield without the need of applying sintering enamels on one of the glass surfaces. As a solution to this problem, it is conceivable to provide a pigmented edge region not to the glass but to the interlayer film. In principle, pigmented edge regions are already known as a "shade band" located in the upper part of the interlayer/windshield to protect the driver from sunlight. However, since interlayer films are commonly produced by extrusion, it is technically impossible to produce an interlayer film with a shaded band on all edges respectively with typical details like stamps, dotted gradients and so forth.

From a different technical field, it is known to provide thin PVB-films having a low or no plasticizer content with coatings or electrically conductive structures, which can be combined with common plasticized PVB-films to produce functionalized laminated glazing (EP3074221A1).

SUMMARY OF THE INVENTION

It has now been found that thin PVB-films having a low or no plasticizer content can be coated or printed with pigments in edge regions only. In combination with plasticized PVB-films, such interlayer films provide a pigmented protection band for UV radiation without the need to sinter enamel pigments to the glass surface. An object of the present invention was therefore a laminated glass obtained by laminating at least one film A containing a polyvinyl acetal PA and optionally at least one plasticiser WA and at least one film B containing a polyvinyl acetal PB and at least one plasticiser WB between two glass sheets, wherein prior to lamination the amount of plasticiser WA in film A is less than 22% by weight the amount of plasticiser WB in film B is at least 22% by weight and film A comprises at least on one surface a non-transparent region.

DETAILED DESCRIPTION OF THE PREFERRED EMBODIMENTS

Hereinafter, the term "prior to lamination" refers to the state of the films A and B prior to having any contact with each other. For example, the term refers to the composition of each film separately formed and separately wound on individual rolls. The term "prior to lamination" refers to the state for the layers or films before combining them either in the lamination process of the laminated glass or prior to building a stack from the layers used for lamination.

The term "non-transparent region" refers to any region of the film having a light transmission in the visible spectrum of less than 5%. In a variant, the "non-transparent region" may fade out towards transparency. In such variants, at least a part of the "non-transparent region" of the film has a light transmission in the visible spectrum of less than 5%.

The present invention is especially advantageous for laminates comprising thin glass sheets, since sintering enamels on thin glass is even more prone to produce broken or off-spec bended sheets. In a preferred embodiment of the invention, at least one of the glass sheets has a thickness of less than 1.8 mm, such as less than 1.6; less than 1.4; less than 1.0; or less than 0.9 mm.

Film A

Laminates according to the invention may comprise one or more films A, but at least one thin film A is oriented adjacent to a glass surface of the laminated glass according to the invention. It is also possible to apply a film A to both glass surfaces, such that a laminated glass laminate with a layer sequence glass/film A/film B/film A/glass is provided.

Figure 1:
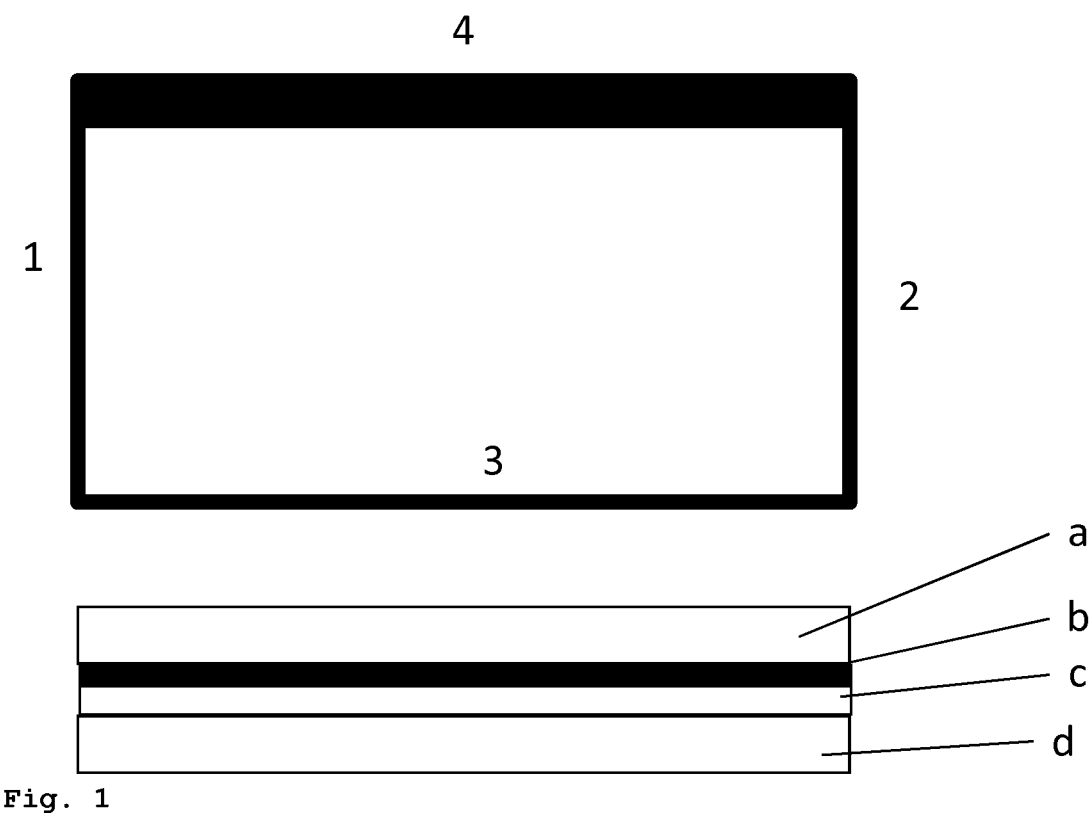
FIG. 1 illustrates one embodiment of a laminated glass structure of the invention

As shown in FIG. 1, the non-transparent region covers preferably at least one edge of film A (1), more preferably two (2), three (3) or all four (4) edges of film A (see FIG. 1). The cross-section of the laminate contains two glass layers a and d; one film A with non-transparent area, b; and more heavily plasticized film B at c.

The width of the pigmented band may be 0.5 to 30 cm, preferably 0.5 to 5 cm. The overall width can be different at different positions. The laminate according to the invention may be used in cars or aircraft, for example, for windscreens or side windows or sunroofs. Especially in the upper part of a windshield (FIG. 1 (1)), the printed band can transition into larger opaque or semi-opaque areas in order to hide driver assist camera assembly or mirror holder.

Figure 2:
FIG. 2 illustrates a further embodiment of a laminated glass structure of the invention

The non-transparent region (hereinafter called "pigmented band" can be completely opaque and/or in part interrupted and/or have a transition area from a completely opaque edge into the non-printed transparent area. Interrupted printing may be achieved in form of dotted patterns. The pigmented band may continuously fade-in from transparent to opaque black or grey (without recurring to easily visible dots). FIG. 2 shows a dotted coating by way of example.

The shape of the printed band may be rectangular or follow the contour of the finished laminated glass.

The terms "pigment" or "pigmented" refer to a coloring material, either inorganic or organic, which should not dissolve in the polymer matrix and thus resist migration from film A to B.

As pigments, carbon black, iron oxides or spinel pigments are preferably used. The pigments may be dispersed in a carrier fluid like water, alcohol or mixtures of alcohol and water. Furthermore, binders like polyvinylalcohol, polyvinylbutyral, Polyvinylpyrrolidone, polyurethanes or poly styrene-acrylate may be added. Such printing compositions are referred to as "printing inks" or simple "inks" hereinafter.

Water-based printing inks are preferred over printing inks based on organic solvents since they do not swell or dissolve the film A and/or lead to film defects. Printing inks based on organic solvents can be used if the coating is thin and/or the drying step is fast such that the solvent does not migrate into the PVB film. It is beneficial to use a low molecular weight PVB as binder for the printing inks since it ensures good compatibility with the PVB films A and B.

The printing inks can be applied via techniques that are commonly known in the printing industry such as offset printing, rotogravure printing, flexography, and screen-printing, followed usually by a drying step.

In order to avoid wrinkling and or deformation of film A due to excessive heating in a drying step, it is crucial, that film A will not be exposed to temperatures above its glass transition temperature as measurable as Tg by the DSC method. It is thus preferred that the temperature of film A during the drying step is kept below Tg of the film by at least 3° C., or at least 5° C., at least 10° C., at least 15° C., or most preferably, at least by 20° C.

The dry-film thickness of the printed parts is between 1-50 µm depending on the printing technique and required opacity. Usually the dry-film thickness is between 10-30 µm.

Preferably, the printed-on pigmented layer on film A will be oriented facing film B rather than the glass surface to avoid differences of adhesion between the transparent center and the printed-on edge portion of film A on the glass surface due to components of the pigmented layer.

Furthermore, the thin film A, which has a low plasticiser content or even no plasticiser content in the starting state, can be perforated prior to the insertion into the glass/film sandwich, such that it can have openings, like passages, holes or slits, in any geometric pattern.

The film A can thus have at least one opening, such that by means of this opening the film B is in direct contact with at least one glass surface. Following adhesive bonding to form the finished laminated glass, the film B with higher plasticiser content in the starting state is adhesively bonded at these points to the glass sheets without interruption. In particular, openings can thus be obtained at points of the laminated glass behind which the function of sensor elements, optics elements and/or antenna elements would otherwise be hindered by am optional heat-shielding or the pigmented layer carried by film A.

Alternatively, the thickness of film A may be utilized to compensate for the thickness of another film which is not provided on the complete surface of film B. In such cases, optical distortion may result from the difference in thickness of the interlayer film. Films A of the invention can equalize the thickness of the additional film, for example by using a frame or an opening of film A to surround the additional film layer, i.e. the additional film layer is provided to the opening of film A. In this case, the thickness of film A may differ less than 50% of the thickness of the additional film layer, preferably less than 30%, and even more preferably less than 15%. At best, film A has substantially the same thickness as the additional film. It is possible to combine several films A to achieve the required total thickness. The additional film may be equipped for example with a IR reflective coating, light-reflective or guiding structures like a semitransparent mirror or holographic layer or electrically conductive structures and/or provide additional penetration resistance like PET films.

In the method according to the invention, the film A in the starting state prior to lamination has a thickness of not more than 20%, preferably not more than 15%, and most preferably no more than 10% of the thickness of the film or films B.

The thickness of a film A in the starting state prior to lamination is 10-250 µm, preferably 20-160 µm, more preferably 30-120 µm, yet more preferably 40-100 µm and, at most preferably 50-80 µm. This range of thickness does not include additional coating on the films. In the laminated glass, the thickness of the film can increase by transfer of plasticiser from film B.

Film A is produced separately from film B (for example extruded or solvent cast) and has either no plasticiser at all or a sufficiently small proportion of plasticiser so that subsequent functionalization and processing is not adversely influenced.

Since film A will preferably be in direct contact with one of the inner surfaces of the laminated glass, it is desirable to control its adhesion to an intermediate level in order to reach satisfactory penetration resistance mandatory for the different glazing positions of a motor vehicle as stipulated in the different safety glass standards like ECE 43R. To this end, film A may contain alkali metal ions and/or earth alkali metal ions to adjust its adhesion level to glass (so called Anti-Adhesion Additives).

As alkali metal ions, potassium or sodium or lithium are preferred. Preferred ranges of concentration of the alkali metal ions are 7-210, preferably 14-140 and more preferably 21-140 ppm in the case of lithium, 23-690, preferably 46-460 and more preferably 69-460 ppm in the case of sodium and 39-1170, preferably 78-780 ppm and more preferably 117-780 in the case of potassium. It is furthermore preferred to add the alkali metal ions in form of salts of carboxylic acids having 1 to 10 carbon atoms. Especially preferred is potassium acetate as an adhesion control agent.

The total amount of alkali metal salts may be as low as 0.005% by weight based on the weight of film A. Preferred ranges of alkali metal salts are 0.01%-0.1%; 0.02-0.08%; and 0.03-0.06%, each weight % based on the weight of film A.

Film A used in the laminates of the invention may additionally comprise alkaline earth metal ions, but since their effect on adhesion is limited, only small amounts as compared to the alkali ion should be used. In a first embodiment of the invention film A comprises 0 to 20 ppm alkaline earth metal ions, preferably 0 to 5 ppm.

However, it is known that alkaline earth metal ions have a balancing effect of adhesion when a plasticized PVB film faces two glass sheets with different surface chemistry. Accordingly, in a second embodiment of the invention, film A comprises 5-20 ppm alkaline earth metal ions. The alkaline earth metal ions can be added in form salts of carboxylic acids having 1 to 10 carbon atoms. Especially preferred is magnesium acetate as a secondary adhesion control agent. In this embodiment, the ratio of alkali ions to alkaline earth ions (in ppm) in film A is preferably at least 1, especially higher than 5 and more preferably higher than 10.

In an alternative to the amount of alkali and earth alkali ions, the alkaline titer of film A and B may be used to characterize the amount of anti-adhesion agents (i.e. alkali and earth alkali salts) in the films. The alkaline titer of film A may be higher than 10, higher than 20, higher than 40, higher than 50, higher than 80, higher than 90 and preferably higher than 100, in each case with a maximum value of 500. In contrast to film A, the alkaline titer of film B is preferred to be lower, and more particularly, the difference between alkaline titer (film A)–alkaline titer (film B) is more than 2, more than 6, and preferably more than 10 AT units.

In order to avoid haze, the amount of chloride ions and/or nitrate ions and/or sulphate ions in film A may be reduced.

The chloride content of the film A can thus be less than 150 ppm, preferably less than 100 ppm, and in particular less than 50 ppm. In the ideal case, the chloride content of the film A is less than 10 ppm or even 0 ppm.

The nitrate content of film A optionally may be less than 150 ppm, preferably less than 100 ppm, and in particular less than 50 ppm. In the ideal case, the nitrate content of film A is less than 10 ppm or even 0 ppm.

Again optionally, the sulphate content of film A may be less than 150 ppm, preferably less than 100 ppm, and in particular less than 50 ppm. In the ideal case, the sulphate content of the film A is less than 10 ppm or even 0 ppm.

Film B

Film B may be any plasticized PVB-film known in the art. The films A and B may contain, in the starting state prior to lamination and/or in a stack prepared for lamination between glass sheets, a single plasticiser as well as mixtures of plasticisers both of different and identical composition. The term "different composition" refers to both the type of plasticiser and proportion thereof in the mixture. Film A and film B after lamination, i.e. in the finished laminated glass, preferably have the same plasticisers WA and WB. In a preferred variant, film A in its starting state, however, does not contain any plasticiser and after lamination contains plasticiser WB in an equilibrium amount.

Plasticiser-containing films B used in accordance with the invention contain, in the starting state prior to lamination, at least 22% by weight, such as 22.0-45.0% by weight, preferably 25.0-32.0% by weight and in particular 26.0-30.0% by weight plasticiser.

Films A used in accordance with the invention may contain, in the starting state prior to lamination, less than 22% by weight (such as 21.9% by weight), less than 18% by weight less than 16% by weight, less than 12% by weight, less than 8% by weight, less than 4% by weight, less than 2% by weight, less than 1% by weight or even no plasticiser (0.0% by weight). In a preferred embodiment of the invention, films A with a low plasticiser content preferably contain 0.0-8% by weight of plasticiser, most preferably 0-4 wght %.

The films A or B preferably contain polyvinyl acetals having a proportion of polyvinyl acetate groups, either identically or differently, of 0.1 to 20 mol %, preferably 0.5 to 3 mol %, or 5 to 8 mol %.

The thickness of film B in the starting state is 450-2500 µm, preferably 600-1000 µm, more preferably 700-900 µm. A plurality of films B may be used in the invention, either being stacked on each other or separated by one or more films A.

If films B are stretched prior to production of the sandwich and/or additionally are adapted to the shape of a screen (for example a windscreen) in a curved manner, the specified thicknesses at the moment of lamination may reduce once more by up to 20%.

Polyvinyl Acetal

The films A and B used in accordance with the invention contain polyvinyl acetals, which are produced by acetalisation of polyvinyl alcohol or ethylene vinyl alcohol copolymer.

The films can contain polyvinyl acetals, each having a different polyvinyl alcohol content, degree of acetalisation, residual acetate content, ethylene proportion, molecular weight and/or different chain lengths of the aldehyde of the acetal groups.

In particular, the aldehydes or keto compounds used for the production of the polyvinyl acetals can be linear or branched (that is to say of the "n" or "iso" type) containing 2 to 10 carbon atoms, which leads to corresponding linear or branched acetal groups. The polyvinyl acetals are referred to accordingly as "polyvinyl (iso)acetals" or "polyvinyl (n)acetals".

The polyvinylacetal used in accordance with the invention results in particular from the reaction of at least one polyvinyl alcohol with one or more aliphatic unbranched ketocompounds containing 2 to 10 carbon atoms. To this end, n-butyraldehyde is preferably used.

The polyvinyl alcohols or ethylene vinyl alcohol copolymers used to produce the polyvinyl acetals in the films A or B may be identical or different, pure or a mixture of polyvinyl alcohols or ethylene vinyl alcohol copolymers with different degree of polymerisation or degree of hydrolysis.

The polyvinyl acetate content of the polyvinyl acetals in the films A or B can be set by use of a polyvinyl alcohol or ethylene vinyl alcohol copolymer saponified to an appropriate degree. The polarity of the polyvinyl acetal is influenced by the polyvinyl acetate content, whereby the plasticiser compatibility and the mechanical strength of the respective layer also change. It is also possible to carry out the acetalisation of the polyvinyl alcohols or ethylene vinyl alcohol copolymers with a mixture of a number of aldehydes or keto compounds.

The films A or B preferably contain polyvinyl acetals having a proportion of polyvinyl acetate groups, either identically or differently, of 0.1 to 20 mol %, preferably 0.5 to 3 mol %, or 5 to 8 mol %.

The polyvinyl alcohol content of the polyvinyl acetal PA used in film A may be between 6-26% by weight, 8-24% by weight, 10-22% by weight, 12-21% by weight, 14-20% by weight, 16-19% by weight and preferably between 16 and 21% by weight or 10-16% by weight.

Independent of film A, the polyvinyl alcohol content of the polyvinyl acetals PB used in film B may be between 14-26% by weight, 16-24% by weight, 17-23% by weight and preferably between 18 and 21% by weight.

In a preferred embodiment of the invention, film A comprises a polyvinyl acetal PA with a proportion of vinyl alcohol groups from 6 to 26% by weight and the film B comprises a polyvinyl acetal B with a proportion of vinyl alcohol groups from 14 to 26% by weight.

The films A or B preferably contain non-crosslinked polyvinyl acetal. The use of cross-linked polyvinyl acetals is also possible. Methods for cross-linking polyvinyl acetals are described, for example, in EP 1527107 B1 and WO 2004/063231 A1 (thermal self-cross-linking of polyvinyl acetals containing carboxyl groups), EP 1606325 A1 (polyvinyl acetals cross-linked with polyaldehydes) and WO 03/020776 A1 (polyvinyl acetal cross-linked with glyoxylic acid).

Plasticizer

Films A and/or B used in accordance with the invention may contain, as plasticiser, one or more compounds selected from the following groups:

- esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate.
- esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate
- phosphates with aliphatic or aromatic ester alcohols, such as tris(2-ethylhexyl)phosphate (TOF), triethyl phosphate, diphenyl-2-ethylhexyl phosphate, and/or tricresyl phosphate
- esters of citric acid, succinic acid and/or fumaric acid.

By definition, plasticisers are organic liquids having a high boiling point. For this reason, further types of organic liquids having a boiling point above 120° C. can also be used as plasticizers.

Films A in the variants in which a plasticiser WA is present in film A in the starting state, and also films B particularly preferably contain 1,2-cyclohexane dicarboxylic acid diisononyl ester (DINCH) or triethylene glycol-bis-2-ethyl hexanoate (3GO or 3G8) as plasticiser.

Film B may consist of at least two sub-films B' and B", which have a different plasticiser content.

In addition, films A and B may contain further additives, such as residual quantities of water, UV absorbers, antioxidants, adhesion regulators, optical brighteners or fluorescent additives, stabilisers, colorants, processing aids, inorganic or organic nanoparticles, pyrogenic silicic acid and/or surface active substances.

In particular, film B may comprise 0.001 to 0.1% by weight of alkaline metal salts and/or alkaline earth salts of carboxylic acids as adhesion control agents. It is preferred that film B contains magnesium ions in an amount of at least 10 ppm, preferably 20 ppm and most preferably 30 ppm.

Lamination Process

The present invention also relates to a method for producing the described penetration resistant glass laminates, in which the film A is positioned on a glass sheet, then covered by at least one film B, and a second glass sheet is then applied.

Alternatively, it is possible for film B to be positioned on a glass sheet, then to be covered by at least one film A, and for a second glass sheet to be applied.

The present invention relates furthermore to a method for producing a laminated glass wherein a stack comprising at least one film A and at least one film B is provided, the stack is positioned on a first glass sheet and a second glass sheet is then applied.

It is possible in accordance with the invention to first melt the film A onto a glass sheet over the entire area or locally by increased temperature and to then cover this with the film B. Alternatively, films A and B can be positioned jointly between two glass sheets and melted at increased temperature.

The lamination step for producing a laminated glass is preferably carried out such that films A and B are positioned between two glass sheets and the layered body thus prepared is pressed under increased or reduced pressure and increased temperature to form a laminate.

To laminate the layered body, the methods with which a person skilled in the art is familiar can be used with and without prior production of a pre-laminate.

So called "autoclave processes" are carried out at an increased pressure from approximately 10 to 15 bar and temperatures from 100 to 150° C. during approximately 2 hours. Vacuum bag or vacuum ring methods, for example according to EP 1 235 683 B1, function at approximately 200 mbar and 130 to 145° C.

Vacuum laminators may also be used. These consist of a chamber that can be heated and evacuated, in which laminated glazings can be laminated within 30-60 minutes. Reduced pressures from 0.01 to 300 mbar and temperatures from 100 to 200° C., in particular 130-160° C., have proven their worth in practice.

In the simplest case, in order to produce the laminated glass laminates, film A or B is positioned on a glass sheet, and the further film B or A is positioned synchronously or subsequently. The second glass sheet is then applied and a glass film laminate is produced. Excessive air can then be removed with the aid of any pre-lamination method known to a person skilled in the art. Here, the layers are also already firstly lightly adhesively bonded to one another and to the glass.

The glass film laminate may then be subjected to an autoclave process. Film A is preferably positioned on the first glass sheet and covered by the thicker film B before the second glass sheet is applied. The method can be carried out in many conceivable and, in principle, practicable variants. For example, film A is easily removed from a roll of an appropriate width, whereas film B has been tailor-cut beforehand to the size of the laminated glass to be produced. This is advantageous in particular in the case of windscreens and other automotive glazing parts. In this case, it is particularly advantageous to additionally still stretch the thicker film B before it is tailor cut. This enables a more economical use of film, or, for the case in which film B has a colour tint, allows the adaptation of the curvature thereof to the upper sheet edge.

In the automotive field, in particular for the production of windscreens, films A and/or B may be provided with a coloured region like an ink ribbon in the upper region of the films. To this end, either the upper part of film B can be co-extruded with a suitably coloured polymer melt.

In accordance with the invention, films B may therefore have a colour tint, which in particular has already been adapted in a prior process step to the geometry of a windscreen by the above described shaping process.

It is also possible for the films B to have a wedge-shaped thickness profile. The laminated glass laminate according to the invention obtains a wedge-shaped thickness profile even with plane-parallel thickness profile of the film A and can be used in motor vehicle windscreens for HUD displays.

In the simplest case, film B is a commercially available PVB film with or without ink ribbon and with or without a wedge-like thickness profile. Films B with nanoparticles dispersed therein for IR protection can also be used as coloured films. Of course, a film B may also be a film having an acoustic function, such that soundproofing properties that are further improved are obtained by combination with a film A. Of course, a film B may already also combine a number of the mentioned functions.

The thin films A are generally produced by extrusion with use of a cast-film line or in the form of a blown film. Here, a surface roughness may also be produced by controlled melt fracture or with the cast-film method additionally by use of a structured chill roll and/or structure back roll. Alternatively, solvent-cast method can be used for producing film A prior to functionalization and use in the described penetration resistant glass laminates. Films used in accordance with the invention preferably have a one-sided surface structure with a roughness Rz from 0 to 25 µm, preferably an Rz from 1 to 20 µm, more preferably an Rz from 3 to 15 µm, and in particular, an Rz from 4 to 12 µm. It is particularly preferable if the side of film A coming into contact with the glass sheet has a surface roughness Rz of no more than 20% of its thickness.

If the surface of film A is provided with a heat-shielding coating, a particularly low surface roughness prior to application of the coating is preferred. In particular, the roughness parameter Ra here is less than 3 µm and Rz is less than 5 µm.

EXAMPLES

PVB resin powder (commercial grade Mowital B60H of Kuraray Europe GmbH) was fed to the inlet funnel of a lab-extruder of the co-rotating twin screw type. 0.525 wt. % relative to the polymer resin of an aqueous solution of potassium acetate and magnesium acetate tetrahydrate was simultaneously dosed into the extruder inlet zone calculated to give rise to 350 ppm potassium acetate and 175 Mg-acetate tetrahydrate in the degassed melt. The melt was extruded from a 34 cm wide slit die onto a cooled chill roll to form and subsequently wind thin, plasticizer free films, in a width of 30 cm with a thickness of about 50 µm (employed and evaluated as film A with ACA)

The films were printed with an opaque black strip as long as the film and 5 cm wide.

Prior to analytical determination of moisture content (Karl-Fischer-Method) and metal content (Ion-Chromatography) the rolls were stored in a conditioned area having a constant climate of 23° C./28% RH.

Commercial automotive grade PVB film with reduced adhesion (TROSIFOL® VG R10 0.76 from Kuraray Europe GmbH=example of film B) was conditioned at the same climate prior to producing the test laminates.

Test laminates in the dimension 30×30 cm were obtained by combining with standard thickness respective extra thin clear glass (2×Planiclear® 2.1 mm respective Planiclear® 2.1 mm+0.7 mm clear glass) cleaned with deionized water <5 µS on a flat glass washing machine) with the film A and B in the following lay-up orders.

For adhesion test and penetration resistance in combination with automotive grade PVB: bottom glass (air side)–film A–VG R10–(tin side) top glass.

The sandwiches were passed through a commercial flat glass laminating nipper-line to produce pre-laminates. Lamination was accomplished by using an autoclave with standard conditions (90 min. comprising 30 min. hold time at 140° C. and 12 bar).

Prior to further mechanical evaluation, laminates were allowed to sit for 1 week at 23° C. ambient conditions.

Penetration resistance of the laminate structures was tested according ECE 43R (2.26 kg steel ball at 23° C., 226 g steel ball at −20° C. and +40° C.). Both laminate configurations (2×2.1 mm and 2.1 mm+0.7 mm) safely passed the requirements as stipulated in ECE R43 for a windshield glazing.

Example 1

The printing was achieved by digital ink-jet printing with commercially available ink-jet inks e.g. SentryGlas® Expressions™ (alcohol solvent based). To prevent attacking of the ink with the Mowital LP BF 6-050, the color strength of a single printing step was chosen so that a translucent film was achieved. The necessary opaqueness was achieved by over-printing the already printed parts and subsequent drying of the film at 22° C. before applying the next layer of printing ink.

Example 2

Printing was achieved by using a water-based printing ink that is suitable for flexographic printing, based on polyurethane as binder and carbon black as pigment. Such printing inks are commercially available e.g. from Siegwerk Druckfarben AG&Co. KGaA, Siegburg. Since the water-based ink does not attack the Mowital LP BF 6-050, the necessary opaqueness was achieved in one printing step. After drying, the water content of film A in the printed region was measured to be 2%.

As film B, commercial automotive grade PVB film with reduced adhesion (TROSIFOL® VG R10 0.76 from Kuraray Europe GmbH) was used.

Laminates comprising printed films A obtained as described exhibited a nicely defined edge between the clear and the opaque black part. No blurring or deformation of the printed area could be observed. Opacity was measured to be clearly below 5% visible light transmission.

Furthermore, the laminates were subject to a heat soak test at 100° C. during 7 days. Neither the printed nor the non-printed sections exhibited any bubbles or other visible defects.

Example 3 and 4

The above disclosed examples were repeated using one sheet of green glass having a thickness of 2.1 mm and one sheet lightweight clear glass having a thickness of 0.7 mm. Similar to the results obtained by using 2×2.1 mm glass, the thus obtained laminated glasses showed no blurring of the pigmented region and an overall aspect close to the one obtained by using enamel printed black frame on one of the inner glass surfaces.

The invention claimed is:

1. A laminated glass windshield, side window, or sunroof produced by laminating two glass sheets with a multilayer laminating film comprising at least one film A containing a polyvinyl acetal PA and optionally one or more plasticisers WA and at least one film B containing a polyvinyl acetal PB and one or more plasticisers WB, wherein prior to lamination:
   the amount of plasticiser WA in film A is less than 8% by weight
   the amount of plasticiser WB in film B is at least 22% by weight,
   film A comprises on at least one surface, a non-transparent region, and
   film A contains 117-780 ppm potassium acetate based on the weight of film A, and 0-20 ppm magnesium acetate based on the weight of film A.

2. The laminated glass of claim 1, wherein the non-transparent region is located on film A in a band having a width of 0.5 to 20 cm from at least one edge of the laminated glass.

3. The laminated glass of claim 1, wherein the non-transparent region is provided by pigments or dyes selected from the group consisting of carbon black, iron oxide and spinel pigments.

4. The laminated glass of claim 1, wherein the non-transparent region is provided to all edge regions of the laminated glass in shape of a frame.

5. The laminated glass of claim 1, wherein film A comprises 0-20 ppm alkaline earth metal ions.

6. The laminated glass of claim 1, wherein the ratio of alkali ions to alkaline earth metal ions in ppm in film A is at least 20.

7. The laminated glass of claim 1, wherein film A comprises a polyvinyl acetal PA with a proportion of vinyl alcohol groups from 6 to 26% by weight.

8. The laminated glass of claim 1, wherein film B comprises a polyvinyl acetal B with a proportion of vinyl alcohol groups from 14 to 26% by weight.

9. The laminated glass of claim 1, wherein the film B has a wedge-shaped thickness profile.

10. The laminated glass of claim 1, wherein at least one of the glass sheets has a thickness of less than 1.8 mm.

11. A method for producing a laminated glass of claim 1, comprising: providing the film A on at least on one surface thereof with a non-transparent region, positioning the film A on a first glass sheet, covering the film A by at least one film B, and covering an outermost film B by a second glass sheet, and laminating at temperatures over 100° C.

12. The method for producing a laminated glass of claim 11, wherein the non-transparent region is provided by coating a suspension of pigments or dyes selected from the group consisting of carbon black, iron oxide, spinel pigments, and mixtures thereof in a carrier liquid on the surface of film A.

13. The method for producing a laminated glass of claim 11, wherein the non-transparent region is fixed on the surface of film A by subjecting the coated film to a temperature which is at least 3° C. below the Tg of film A.

14. The laminated glass of claim 1, wherein the content of plasticizer WA in film A is from 0 to 4 wt. % based on the weight of film A.

15. The laminated glass of claim 1, wherein film A contains no plasticizer.

* * * * *